United States Patent Office 3,114,258
Patented Dec. 17, 1963

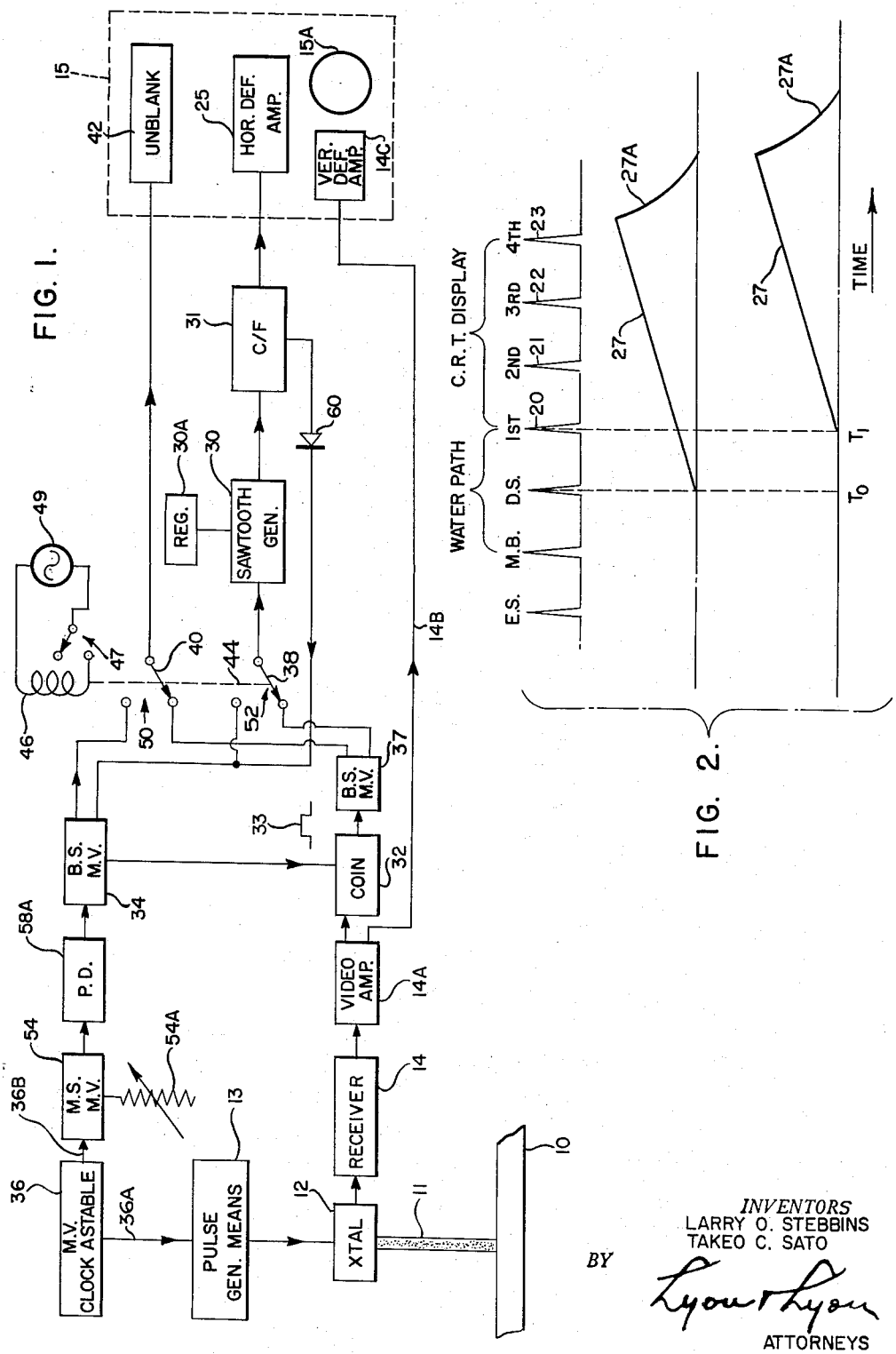

3,114,258
MEANS AND TECHNIQUES FOR ELIMINATING EFFECTS OF VARYING WATER PATH LENGTHS IN METAL INSPECTION
Larry O. Stebbins, Temple City, and Takeo C. Sato, Los Angeles, Calif., assignors, by mesne assignments, to Automation Industries, Inc., El Segundo, Calif., a corporation of California
Filed Aug. 23, 1960, Ser. No. 51,315
3 Claims. (Cl. 73—67.9)

The present invention relates to improved metal inspection systems in which a series of time-spaced energy pulses are periodically transferred to a metal test piece and the resulting echo signals are observed, indicated or recorded.

These resulting echo signals are from the front and back surfaces of the test piece as well as from those intermediate points or regions where there is an inhomogeneity in the metal. Such inhomogeneity, for example, may be a crack, fissure, blow hole or the like, all of which may be characterized by the term flaw. The present invention has applicability not only to detection of such flaws but also to measurement of wall thickness of the metal, i.e., the time required for energy to propagate from the front to the back surface or vice versa.

In commercial inspection and wall thickness determinations resort has been made to the use of a water stream or static water column between an electromechanical transducer, i.e., a crystal, and the test piece for the transfer of energy to and from the test piece. This expedient of using a water stream as an energy coupling media has been found particularly useful in the inspection and wall thickness measurement of large diameter pipe or tubing as used in oil fields since inspection or measurement may then be made on a continuous basis. For example, the pipe or tubing may be rotated about its axis and the assembly including the transducer which has means associated therewith for producing the water stream may simultaneously be moved parallel with the axis of the rotating pipe so that a spiral inspection pattern is defined. Using this expedient, inspection and measurement is accomplished on a continuous basis with each incremental part of the metal being tested and without the necessity of interrupting the measuring or inspection process in order to allow a physical placement of the transducer on the test piece as is required by prior art techniques.

However, certain problems arise in the use of a water stream for these purposes since as a practical matter, the length of the water path does not remain constant but varies when and as the pipe is being rotated and the transducer is being moved with the result that more or less time is required for the energy to be conveyed through the corresponding variable length of water path thereby causing the reflections, from for example, the outer surface of the pipe, to occur at different times. This means that there is no convenient stable time reference point with respect to which accurate measurements may be made conveniently and quickly.

The present invention is addressed to the solution of these problems resulting from a variable water path length, as described herein, in general, are solved by making the indications of such reflections dependent upon a time coincident condition between the first reflection and a signal derived from the energy pulse generator. By so doing the first reflection becomes a fixed measuring reference point which remains as such unaffected by changes in water path length.

It is therefore a general object of the present invention to provide means and techniques for accomplishing the general purposes and obviating the problems indicated above.

A specific object of the present invention is to provide an improved metal inspection system which allows the use of variable length water paths in the continuous inspection of metals.

Another specific object of the present invention is to provide an improved metal inspection system in which more stable indications of reflections are obtained, particularly so when indications are being observed of those so-called multiple reflections occurring after the main reflections from the front and back faces of the test piece.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates a metal inspection system embodying features of the present invention.

FIGURE 2 illustrates on a time basis the occurrence of certain voltages or currents in the system shown in FIGURE 1.

Referring to the drawings, FIGURE 1 shows a metal inspection system for determining thicknesses and flaws in a metal test piece 10 which has recurrent pulses of energy supplied thereto through a water stream 11 from a crystal transducer 12 operating at a frequency of, for example, 10 megacycles, the crystal 12 being recurrently excited by conventional pulse generating means 13 to periodically supply such 10 megacycle energy to the test piece 10. The same crystal 12 is excited by the resulting returning echoes from the front and back faces of the test piece 10 as well as from the flaws therein to develop corresponding voltages which are amplified and detected in receiver 14 and amplified in the video amplifier section 14A before being applied via connection 14B to the vertical deflection amplifier 14C in the cathode ray tube circuit 15.

The resulting display on the screen 15A of the C.R.T. is indicated in FIGURE 2 in the form of so-called "pips" wherein the first vertical deflection 20 on a horizontal time base scale represents the reflection from the front face of the test piece 10, the second deflection 21 represents the reflection from the back face of test piece 10 and the third and fourth deflections 22 and 23 represent subsequent so-called multiple reflections from the front and back faces respectively resulting from the reverberation of the originally supplied energy inside the metal test piece.

In order to produce an indication of the time separation of pulses 20, 21, 22 and 23 the cathode beam of the cathode ray tube 15 is swept horizontally at preferably a uniform rate by development of a so-called sweep voltage or current as the case may be to the horizontal deflection amplifier 25 of C.R.T. circuit 15.

In accordance with an important feature of the present invention such sweep voltage is initiated at a time which is independent of the length of water stream 11. In general, this is accomplished by initiating the horizontal sweep voltage 27 (FIGURE 2) at a time $T_1$ corresponding to the time of appearance of the first reflection 20 and such that only the first "pip" 20 and the subsequent pips 21, 22, 23 are visible on the C.R.T. screen 15A. More specifically, this is accomplished by initiating operation of the sawtooth generator 30 in response to a coincident condition in coincidence network 32 having applied as inputs thereto the video output of video amplifier 14A and a voltage wave 33 derived from a multivibrator 34 which is triggered by a pulse developed in the multivibrator timing circuit 36. The output of sawtooth generator 30 is applied to the horizontal deflection amplifier 25 through cathode follower (C/F) stage 31. When the first video signal and voltage wave 33 occur simultaneously an output signal is developed in the coincidence circuit 32 to trigger the bistable multivibrator 37 having one of its outputs applied through switch arm 38 to the sawtooth generator and the other one of its outputs applied through switch arm 40 to the unblanking circuit 42 in the C.R.T. circuit 15. The two switch arms 38 and 40 are mechanically interlocked or ganged as indicated by the dotted line 44 and the same may comprise relay switch arms of a relay having an actuating coil 46 for operating the two single pole double throw switches 50 and 52.

This timing multivibrator 36 may be a free-running multivibrator and has one of its outputs illustrated by E.S. (early synch signal) in FIGURE 2 supplied over connection 36A to the pulse generating means 13 which develops the energy supplied to the test piece, such energy being referred to as the main bang M.B. and is also illustrated in FIGURE 2. A second output of the timing circuit 36 is supplied over connection 36B to a monostable multivibrator 54 having an adjustable delay control 54A for developing the delayed synch signal (D.S.) also represented in FIGURE 2. This delay signal D.S. is applied to the so-called pull down tube or stage 58A for the bistable multivibrator 34 which produces the voltage wave 33 of sufficiently long time duration to assure the previously-mentioned coincident condition.

In order to terminate the voltage wave 33, i.e., to reset the bistable multivibrator stages 34 and 37, the trailing edge 27A of the sawtooth voltage wave appearing in the output of cathode follower stage 31 is applied through the unidirectional conducting device or diode 60 to the multivibrator stage 34. The coincident tube 32 serves also as a pull down stage for bistable multivibrator 37 so that termination of pulse 33 by the reset signal serves also to reset M.V. stage 37.

The sawtooth generator 30 is preferably of the boot strap type including a tube which in its quiescent state is in a saturated condition and a tube or stage 30A is connected thereto adjust the plate resistance of the saturated tube.

Optionally the system may be operated so that the horizontal sweep voltage 27 is initiated at the time $T_0$, earlier than $T_1$, as illustrated in FIGURE 2 and for that purpose the ganged relay switches 50 and 52 are operated to their other positions by moving the control switch 47 to its other position so that the relay coil 46 is then energized by voltage source 49. After this is done, the delayed synch signal (D.S.) again initiates operations of the bistable multivibrator 34 which now has output signals applied to the unblanking circuit 42 through switch arm 40 and to the sawtooth generator 30 through switch arm 38 so that the horizontal sweep voltage is initiated substantially contemporaneously with the time of occurrence of delay synch signal (D.S.) i.e., at time $T_0$.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a metal inspection system of the character described wherein energy pulses are transferred to and from a test piece through a water path, a timing multivibrator, pulse generating means operated by said timing multivibrator, a transducer coupled to said generating means, a water path coupling said transducer to said test piece to supply energy from said generating means to said test piece, receiving means coupled to said transducer for receiving and amplifying energy pulses corresponding to reflections from the front and back faces of said test piece, a delay monostable multivibrator coupled to said timing multivibrator and operated thereby in timed relationship therewith, a first bistable multivibrator coupled to said monostable multivibrator, a coincidence circuit having an input circuit, means coupling the output of said first bistable multivibrator to said input circuit, means coupling said energy pulses to said input circuit, said coincidence circuit functioning to produce an output signal upon a time coincident condition of said output of said bistable multivibrator and an energy pulse corresponding to a reflection from said front face, a second bistable multivibrator coupled to the said coincidence circuit and operated by said output signal, a cathode ray tube circuit including a pair of quadraturely acting beam deflecting means, means coupling one of said beam deflecting means to said receiving means, sweep generating means coupled to the other one of said beam deflecting means, and means applying said output signal to said sweep generating means to initiate operation of the same.

2. A system as set forth in claim 1 including means coupled between the output of said sweep generating means and said first and second bistable multivibrators for resetting the same.

3. A system as set forth in claim 1 in which said coincidence circuit comprises a pull down control for said second bistable multivibrator.

References Cited in the file of this patent

UNITED STATES PATENTS

| | | |
|---|---|---|
| 2,682,766 | Van Valkenburg | July 6, 1954 |
| 2,883,860 | Henry | Apr. 28, 1959 |